United States Patent
Yokoyama et al.

(10) Patent No.: US 9,797,320 B2
(45) Date of Patent: Oct. 24, 2017

(54) ENGINE SYSTEM WITH INTAKE BYPASS DEVICE

(71) Applicant: MITSUBISHI HEAVY INDUSTRIES, LTD., Tokyo (JP)

(72) Inventors: Takao Yokoyama, Tokyo (JP); Seiichi Ibaraki, Tokyo (JP); Isao Tomita, Tokyo (JP); Katsuyuki Osako, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/911,591

(22) PCT Filed: Oct. 11, 2013

(86) PCT No.: PCT/JP2013/077786
§ 371 (c)(1),
(2) Date: Feb. 11, 2016

(87) PCT Pub. No.: WO2015/052837
PCT Pub. Date: Apr. 16, 2015

(65) Prior Publication Data
US 2016/0215712 A1 Jul. 28, 2016

(51) Int. Cl.
*F02B 33/44* (2006.01)
*F01N 3/00* (2006.01)
(Continued)

(52) U.S. Cl.
CPC ....... *F02D 41/0007* (2013.01); *F01D 17/105* (2013.01); *F01D 17/146* (2013.01);
(Continued)

(58) Field of Classification Search
CPC .. F02B 37/168; F02D 41/0007; F01D 17/105; F01D 25/10
(Continued)

(56) References Cited

U.S. PATENT DOCUMENTS 3,796,046 A    3/1974   Klaue et al.
4,122,673 A * 10/1978   Leins .................... F02B 37/166
                                                                                60/605.1
(Continued)

FOREIGN PATENT DOCUMENTS

DE       38 18230 A1    12/1989
JP       63-314320 A    12/1988
(Continued)

OTHER PUBLICATIONS

Machine generated translation of DE3818230A1 obtained on Apr. 25, 2017 from https://worldwide.espacenet.com/.*
(Continued)

*Primary Examiner* — Ngoc T Nguyen
(74) *Attorney, Agent, or Firm* — Birch, Stewart, Kolasch & Birch, LLP

(57) ABSTRACT

An object is to provide an engine system including an intake bypass device whereby it is possible to expand the operation range of a compressor without causing the output of a turbine to become insufficient. An engine system includes an intake bypass device including a bypass channel connecting a downstream side of a compressor of a turbocharger in an intake channel and an upstream side of a turbine of the turbocharger in an exhaust channel, a bypass valve disposed in the bypass channel and configured to control a flow of compressed intake air in the bypass channel, and a heating unit for heating the compressed intake air flowing through the bypass channel.

5 Claims, 9 Drawing Sheets

(51) Int. Cl.

| | | |
|---|---|---|
| F02D 41/00 | (2006.01) | |
| F01N 5/02 | (2006.01) | |
| F02B 37/16 | (2006.01) | |
| F02B 37/20 | (2006.01) | |
| F01N 3/02 | (2006.01) | |
| F01N 3/10 | (2006.01) | |
| F02B 33/40 | (2006.01) | |
| F02D 41/26 | (2006.01) | |
| F01N 3/05 | (2006.01) | |
| F01N 3/28 | (2006.01) | |
| F02B 39/00 | (2006.01) | |
| F01D 17/14 | (2006.01) | |
| F02C 6/12 | (2006.01) | |
| F01D 17/10 | (2006.01) | |
| F01D 25/10 | (2006.01) | |
| F02C 3/13 | (2006.01) | |
| F02C 9/18 | (2006.01) | |
| F04D 27/02 | (2006.01) | |

(52) U.S. Cl.
CPC ........... *F01D 25/10* (2013.01); *F01N 3/0205* (2013.01); *F01N 3/055* (2013.01); *F01N 3/10* (2013.01); *F01N 3/2889* (2013.01); *F01N 5/02* (2013.01); *F02B 33/40* (2013.01); *F02B 37/168* (2013.01); *F02B 37/20* (2013.01); *F02B 39/005* (2013.01); *F02C 3/13* (2013.01); *F02C 6/12* (2013.01); *F02C 9/18* (2013.01); *F02D 41/26* (2013.01); *F04D 27/0223* (2013.01); *F02B 2037/162* (2013.01); *F05D 2270/101* (2013.01); *F05D 2270/301* (2013.01); *F05D 2270/3013* (2013.01); *Y02T 10/144* (2013.01); *Y02T 10/16* (2013.01); *Y02T 10/20* (2013.01)

(58) Field of Classification Search
USPC ........................................ 60/606, 274, 605.1
See application file for complete search history.

(56) References Cited

U.S. PATENT DOCUMENTS

| | | | | |
|---|---|---|---|---|
| 4,404,805 A * | 9/1983 | Curtil | ............... | F02B 37/168 60/606 |
| 5,987,885 A | 11/1999 | Kizer et al. | | |
| 6,038,860 A | 3/2000 | Bailey | | |
| 6,358,109 B1 * | 3/2002 | Neisen | .................. | F01N 3/05 440/89 B |
| 6,637,204 B2 * | 10/2003 | Ellmer | .................. | F01N 3/32 60/606 |
| 7,032,382 B2 * | 4/2006 | Onodera | ............. | F02B 37/16 60/606 |
| 8,627,662 B2 * | 1/2014 | Freund | ................. | F02G 5/02 60/606 |
| 2006/0064981 A1 * | 3/2006 | Kojima | ............... | F02B 37/16 60/612 |
| 2007/0034195 A1 * | 2/2007 | Wijk | .................. | F02B 37/12 123/559.1 |
| 2007/0289954 A1 * | 12/2007 | Bien | ................... | F02B 67/10 60/697 |
| 2010/0095671 A1 | 4/2010 | Takagawa et al. | | |
| 2011/0138774 A1 * | 6/2011 | Pursifull | ............ | F01N 3/055 60/273 |
| 2012/0117962 A1 * | 5/2012 | VanDyne | ......... | F02B 37/168 60/600 |

FOREIGN PATENT DOCUMENTS

| | | | |
|---|---|---|---|
| JP | 10-281017 | A | 10/1998 |
| JP | 2921434 | B2 * | 7/1999 |
| JP | 2000-64844 | A | 2/2000 |
| JP | 2004-346776 | A | 12/2004 |
| JP | 2005-188351 | A | 7/2005 |
| JP | 2007-85266 | A | 4/2007 |
| JP | 2007-162545 | A | 6/2007 |
| JP | 2008-151006 | A | 7/2008 |
| JP | 2008-190503 | A | 8/2008 |
| JP | 2010-38201 | A | 2/2010 |
| JP | 2012-159079 | A | 8/2012 |
| WO | WO 2013/118410 | A1 | 8/2013 |

OTHER PUBLICATIONS

International Preliminary Report on Patentability and Written Opinion of the International Searching Authority (Forms PCT/IB/338, PCT/IB/373, PCT/IB/326 and PCT/ISA/237), dated Apr. 21, 2016, for International Application No. PCT/JP2013/077786, with an English translation of the Written Opinion.
International Search Report (Forms PCT/ISA/220 and PCT/ISA/210), dated Dec. 3, 2013, for International Application No. PCT/JP2013/077786.
Japanese Decision to Grant a Patent, dated Dec. 2, 2016, for Japanese Application No. 2015-541405, along with an English translation.
Extended European Search Report dated Sep. 22, 2016 in the corresponding European Application No. 13895188.4.
Chinese Office and Search Report, dated Apr. 19, 2017, for corresponding Chinese Application No. 201380077737.7, with English translation of the Office Action only.

\* cited by examiner

ENGINE SYSTEM WITH INTAKE BYPASS DEVICE

TECHNICAL FIELD

The present disclosure relates to an engine system including an intake bypass device for guiding a part of compressed intake air compressed by a compressor to an upstream side of a turbine bypassing an engine body.

BACKGROUND ART

As a technique to improve an output of an engine, a method (supercharging) of compressing intake air with a turbocharger and supplying an engine with the compressed intake air is known, and widely used in engines for automobiles and the like. Especially in recent years, supercharging is applied to a wide operation range of from a low-output range to a high-output range, in view of the regulations on exhaust gas and fuel consumption rate that have become increasingly stricter.

On the other hand, in a turbocharger, surging may occur transitionally depending on the operation state of the turbocharger. Occurrence of surging in a turbocharger may lead to breakage of various devices such as an impeller, and thus needs to be prevented as much as possible. In view of this, a technique to widen the operation range of a compressor while avoiding occurrence of surging has been required.

A known technique to widen the operation range of a compressor while avoiding occurrence of surging is an intake bypass device which guides a part of compressed intake air compressed by a compressor to flow to an upstream side of a turbine bypassing an engine body, as disclosed in Patent Document 1, for instance.

The intake bypass device of Patent Document 1 includes a bypass channel connecting a downstream side of the compressor in an intake channel and an upstream side of the turbine in an exhaust channel, and a flow-rate adjustment valve disposed in the bypass channel. The flow-rate adjustment valve is controlled so that the valve opening degree increases when the operation point of the compressor enters the vicinity of a surge region. When the valve opening degree of the flow-rate adjustment valve increases, the flow rate of the compressed intake air guided to flow to the upstream side of the turbine via the bypass channel increases. As a result, the turbine output increases and the operation flow rate of the compressor increases, which makes it possible to prevent surging.

CITATION LIST

Patent Literature

Patent Document 1: JP2000-64844A

SUMMARY

Problems to be Solved

However, in the intake bypass device disclosed in the above described Patent Document 1, compressed intake air having a relatively low temperature merges with exhaust gas having a high temperature discharged from the engine, and the turbine is driven by the exhaust gas having incorporated the compressed intake air. Thus, the energy of exhaust gas that drives the turbine may decrease, and the output of the turbine may be insufficient.

At least one embodiment of the present invention was made in view of the above conventional problem, and an object of the at least one embodiment is to provide an engine system including an intake bypass device whereby it is possible to widen an operation range of a compressor without causing an output of a turbine to become insufficient.

Solution to the Problems

An engine system according to at least one embodiment of the present invention comprises: an engine body; an intake channel for supplying intake air to the engine body; an exhaust channel through which exhaust gas discharged from the engine body flows; a turbocharger including a turbine disposed in the exhaust channel and driven by energy of the exhaust gas discharged from the engine body, and a compressor disposed in the intake channel and driven coaxially with the turbine; and an intake bypass device for guiding a part of compressed intake air compressed by the compressor to flow to an upstream side of the turbine bypassing the engine body. The intake bypass device includes a bypass channel connecting a downstream side of the compressor in the intake channel and an upstream side of the turbine in the exhaust channel, a bypass valve disposed in the bypass channel and configured to control a flow of the compressed intake air in the bypass channel, and a heating unit for heating the compressed intake air flowing through the bypass channel.

In the engine system including the above intake bypass device, the intake bypass device includes the heating unit for heating the compressed intake air flowing through the bypass channel, and is configured so that the compressed intake air having been heated is guided to flow to the upstream side of the turbine. Thus, it is possible to prevent a decrease in the energy of the exhaust gas for driving the turbine and to prevent shortage of the output of the turbine.

In some embodiments, the heating unit is configured to utilize the exhaust gas discharged from the engine body as a heat source for heating the compressed intake air flowing through the bypass channel.

According to the above embodiment, it is possible to heat the compressed intake air flowing through the bypass channel by effectively utilizing the thermal energy of the exhaust gas discharged from the engine body without providing an additional heat source such as a heater separately.

In some embodiments, the heating unit comprises a turbine housing of the turbine forming at least a part of an inner wall surface of the bypass channel, in a partial section of the bypass channel.

According to the above embodiment, it is possible to heat the compressed intake air flowing through the bypass channel using the thermal energy of the exhaust gas flowing through the turbine housing. In addition, since it is possible to cool the turbine housing with the compressed intake air flowing through the bypass channel, it is no longer necessary to use an expensive heat-resistant material for the turbine housing, which makes it possible to reduce the cost.

In the above embodiment, at least a part of the turbine housing has a dual structure including an inner housing formed of sheet metal and an outer housing formed of sheet metal covering the inner housing. Further, the space defined by the inner housing and the outer housing forms a partial section of the bypass channel in the above embodiment.

According to the above embodiment, the space defined by the inner housing and the outer housing constitutes a partial section of the bypass channel in the above embodiment, and the compressed intake air flows through this space, which makes it possible to heat the compressed intake air and cool the turbine housing efficiently.

In some embodiments, the engine system further comprises an exhaust-gas purification device for purifying the exhaust gas discharged from the engine body. The exhaust-gas purification device is disposed on a downstream side of the turbine in the exhaust channel. The heating unit comprises the exhaust channel on a downstream side of the exhaust-gas purification device forming at least a part of an inner wall surface of the bypass channel, in a partial section of the bypass channel.

According to the above embodiment, it is possible to heat the compressed intake air flowing through the bypass channel using the thermal energy of the exhaust gas flowing through the exhaust channel. In addition, since the remaining thermal energy of the exhaust gas after having driven the turbine and passed through the exhaust-gas purification device to heat a medium is recovered, it is possible to heat the compressed intake air without affecting the output of the turbine or the purification performance of the exhaust-gas purification device.

In the above embodiments, at least a part of the exhaust channel on the downstream side of the exhaust-gas purification device has a dual structure including an inner exhaust duct through which the exhaust gas flows and an outer exhaust duct covering the inner exhaust duct. Further, a space defined by the inner exhaust duct and the outer exhaust duct forms a partial section of the bypass channel.

According to the above embodiment, the space defined by the inner exhaust duct and the outer exhaust duct constitutes a partial section of the bypass channel in the above embodiment, and the compressed intake air flows through this space, which makes it possible to heat the compressed intake air efficiently.

In some embodiments, the heating unit comprises an exhaust manifold connecting the engine body and the exhaust channel forming at least a part of an inner wall surface of the bypass channel, in a partial section of the bypass channel.

According to the above embodiment, it is possible to heat the compressed intake air flowing through the bypass channel using the thermal energy of the exhaust gas flowing through the exhaust manifold. In addition, since the heat is exchanged with the high-temperature exhaust gas flowing through the exhaust manifold, it is no longer necessary to use an expensive thermal-resistant material for the exhaust manifold and the exhaust channel or the like disposed on the downstream side of the exhaust manifold, which makes it possible to reduce the cost.

In the above embodiments, at least a part of the exhaust manifold has a dual structure including an inner exhaust manifold through which the exhaust gas flows and an outer exhaust manifold covering the inner exhaust manifold. Further, a space defined by the inner exhaust manifold and the outer exhaust manifold forms a partial section of the bypass channel.

According to the above embodiment, the space defined by the inner exhaust manifold and the outer exhaust manifold constitutes a partial section of the bypass channel in the above embodiment, and the compressed intake air flows through this space, which makes it possible to heat the compressed intake air and cool the exhaust manifold efficiently.

In some embodiments, the intake bypass device includes a turbo control unit including a control part and a signal input part separate and independent from an engine control unit for controlling an operation state of the engine body, and the turbo control unit includes a bypass-valve control part for controlling a valve opening degree of the bypass valve.

In accordance with the improvement of the engines in recent years, the control logic and hardware configuration of an engine controller is becoming increasingly complicated. Thus, if the bypass-valve control part for controlling the valve opening degree of the bypass valve is mounted to the engine controller, the control logic and hardware configuration of the engine would become even more complicated. Further, if a quickly-changing transitional phenomenon like surging is to be controlled by an engine controller having a control logic and hardware configuration which are complicated, communication delay of the engine controller may be a problem.

Thus, as in the present embodiment, it is possible to prevent the engine control unit from becoming complicated by mounting the bypass-valve control part to the turbo control unit configured separately from the engine control unit.

In the above embodiment, the turbo control unit includes a turbo signal input part into which a sensor signal related to an operation state of the engine such as a boost pressure, an intake flow rate, an engine rotation speed, and a turbo rotation speed is inputted, and a turbo control part including an operation-point computing part and the bypass-valve control part, the operation-point computing part being configured to compute an operation point of the compressor on the basis of the sensor signal inputted into the turbo signal input part. Further, the bypass-valve control part is configured to control the valve opening degree of the bypass valve to increase when the operation point computed by the operation-point computing part is in the vicinity of a surge region.

According to the above embodiment, since the turbo control unit itself computes the operation point of the compressor and controls the valve opening degree of the bypass valve on the basis of the computed operation point, it is possible to control the bypass valve quickly while avoiding an influence of communication delay as compared to a case where the engine control unit controls the valve opening degree of the bypass valve.

In the above embodiment, the sensor signal comprises a sensor signal related to a boost pressure of the compressed intake air compressed by the compressor and to an intake flow rate of the intake air flowing through the compressor.

According to the above embodiment, it is possible to compute the operation point of the compressor from the boost pressure and the intake flow rate accurately.

Advantageous Effects

According to at least one embodiment of the present invention, it is possible to provide a DPF regeneration control device whereby it is possible to prevent clogging of a DOC more efficiently than the conventional technique, and to recover the DOC securely from the clogging even if the DOC is actually clogged.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

First Embodiment

Figure 1:
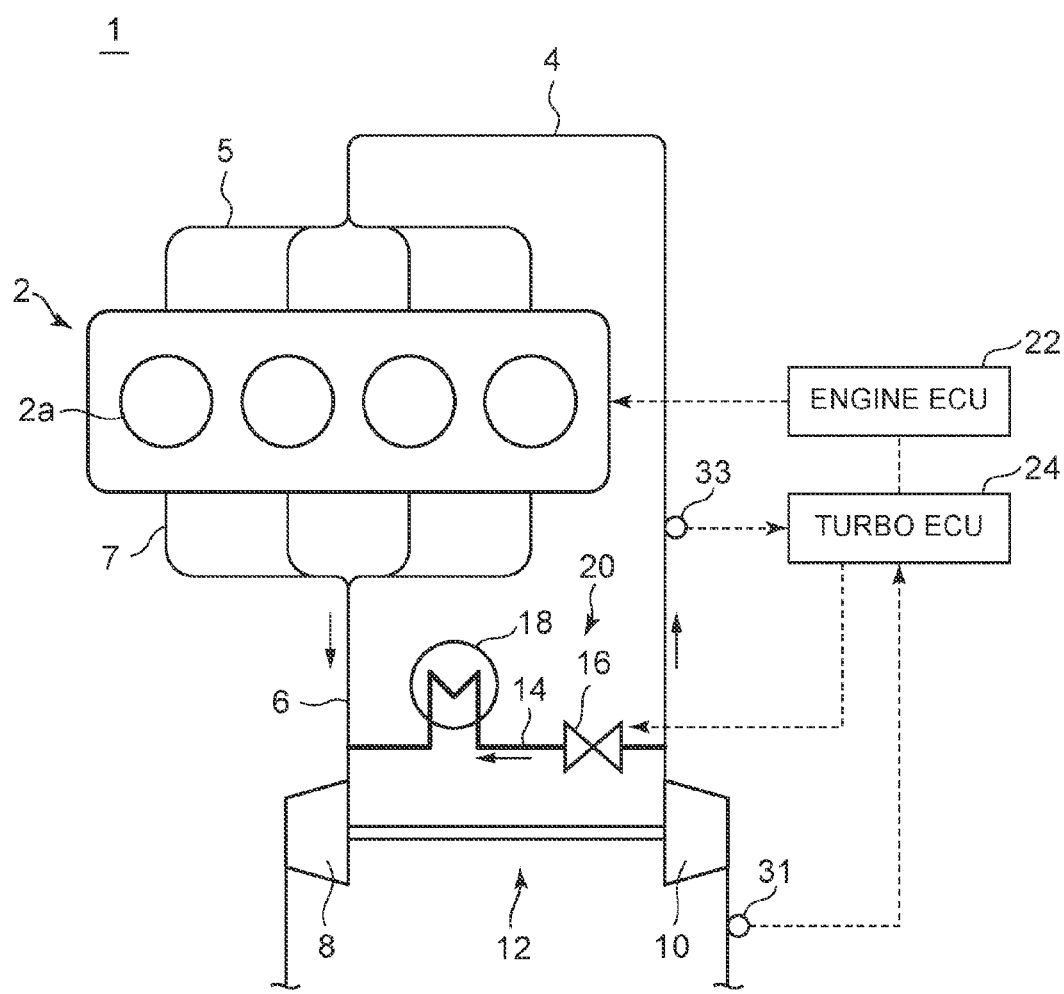
FIG. 1 is an overall configuration diagram of an engine system including an intake bypass device according to the first embodiment of the present invention.

FIG. 1 is an overall configuration diagram of an engine system including an intake bypass device according to the first embodiment of the present invention.

As illustrated in FIG. 1, the engine system 1 of the present embodiment at least includes an engine body 2, an intake channel 4 for supplying intake air to cylinders 2a of the engine body 2, an exhaust channel 6 for carrying exhaust gas discharged from the cylinders 2a of the engine body 2, a turbocharger 12 for compressing intake air to be supplied to the engine body 2, and an intake bypass device 20 for guiding a part of the compressed intake air compressed by the turbocharger 12 to the exhaust channel 6 bypassing the engine body 2.

The engine body 2 includes a plurality of cylinders 2a. The engine body 2 and the intake channel 4 are connected to each other via an intake manifold 5, and the intake manifold 5 distributes the intake air flowing through the intake channel 4 to each of the plurality of cylinders 2a. Further, the engine body 2 and the exhaust channel 6 are connected to each other via an exhaust manifold 7, and the exhaust manifold 7 collects the exhaust air discharged from the plurality of cylinders 2a into the exhaust channel 6.

The turbocharger 12 includes a turbine 8 disposed in the exhaust channel 6, and a compressor 10 disposed in the intake channel 4 and coupled to the turbine 8 via a rotor to be driven coaxially with the turbine 8. The turbine 8 is driven by exhaust energy of the exhaust gas discharged from the engine body 2, and thereby the compressor 10 is coaxially driven, so as to compress the intake air flowing through the intake channel 4.

Further, on the upstream side of the compressor 10 of the intake channel 4, an airflow meter 31 for measuring an intake flow rate is disposed. Further, on the downstream side of the compressor 10 of the intake channel 4, a pressure sensor 33 for measuring a boost pressure of the compressed intake air is disposed.

The intake bypass device 20 includes a bypass channel 14 connecting the downstream side of the compressor 10 in the intake channel 4 and the upstream side of the turbine 8 in the exhaust channel 6, a bypass valve 16 disposed in the bypass channel 14, and a heating unit 18 for heating the compressed intake air flowing through the bypass channel 14.

The bypass valve 16 of the present embodiment is configured as a flow-rate control valve for controlling the flow rate of the compressed intake air guided to flow to the exhaust channel 6 from the intake channel 4. The valve opening degree of the bypass valve 16 is controlled by a turbo ECU (turbo control unit) 24 described below, so that surging does not occur in the compressor 10. In the present invention, the type of the bypass valve 16 is not limited to a flow-rate control valve. It is sufficient if the bypass valve 16 can at least prevent a backward flow of the exhaust gas from the exhaust channel 6 to the intake channel 4, and the bypass valve 16 may be a check valve or the like.

Figure 2:
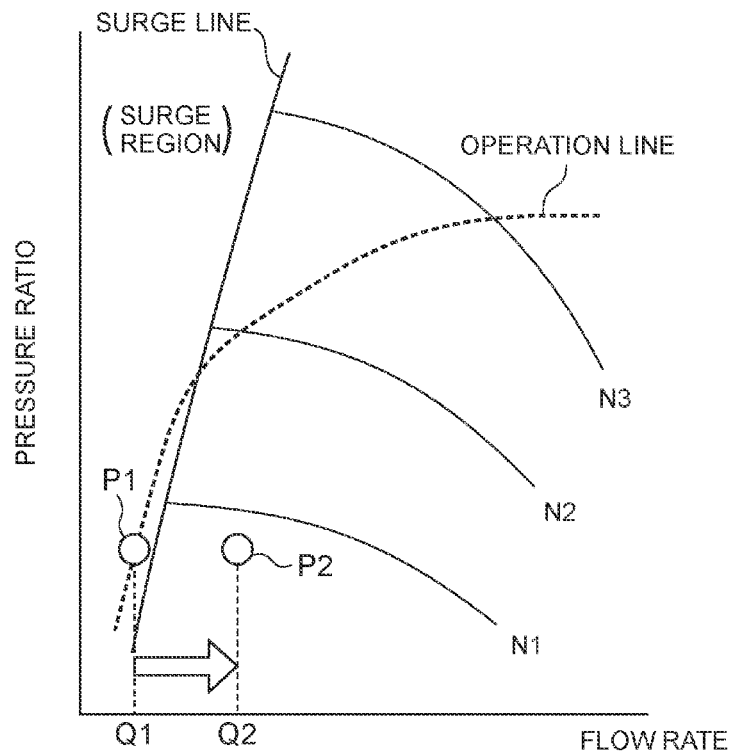
FIG. 2 is a compressor map showing the operation characteristics of a compressor.

FIG. 2 is a compressor map showing the operation characteristics of a compressor. In the drawing, x-axis is the flow rate and y-axis is the pressure ratio of the pressure at the inlet to that at the outlet of the compressor 10. The reference signs N1, N2, N3 in the drawing each represent the rotation speed of the compressor.

As illustrated in FIG. 2, when the compressor 10 is operating at a small flow rate and at a high pressure ratio, the operating point P1 may shift to the left side of the surge line to enter the surge region. The operating point (operation line) of the compressor 10 entering the surge region represents occurrence of surging in the compressor 10. Thus, when the operation point (operation line) of the compressor 10 is in the vicinity of the surge region, the bypass valve 16 is controlled to have a large valve-opening degree, to increase the flow rate of the compressed intake air guided to flow to the exhaust channel 6 from the intake channel 4. In this way, the turbine output increases and the operation flow rate of the compressor 10 increases (Q1 to Q2), and thereby the operation point P2 shifts out of the surge region. As a result, surging is prevented.

Figure 3:
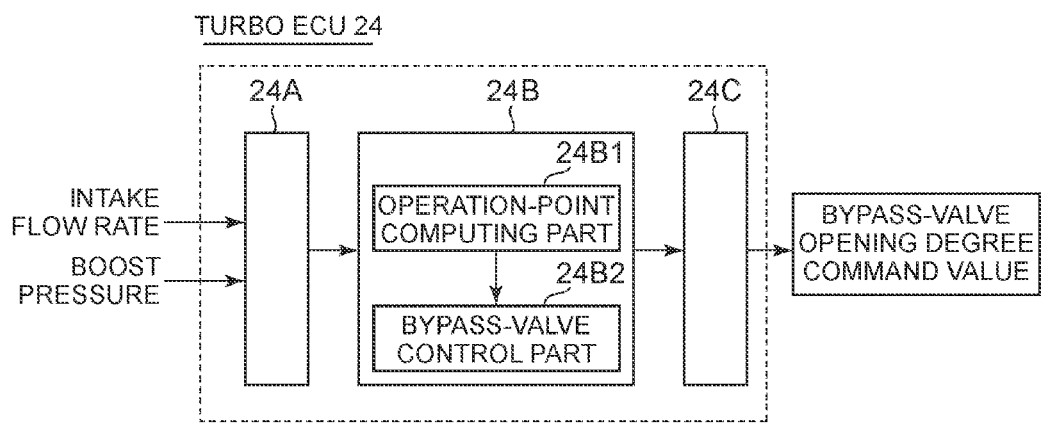
FIG. 3 is a block diagram for describing the function of a turbo ECU.

FIG. 3 is a block diagram for describing the function of a turbo ECU.

The turbo ECU 24 is a control unit independent from an engine electronic control unit (ECU) 22 for controlling the operation state of the engine body 2, and includes a control part 24B and a signal input part 24A separate and independent from the engine ECU 22. The turbo ECU 24 and the engine ECU 22 are configured as a microcomputer including a central processing unit (CPU), a random access memory (RAM), a read only memory (ROM), and an I/O interface.

As illustrated in FIG. 3, the turbo ECU 24 includes the signal input part 24A, the turbo control part 24B, and a signal output part 24C. To the signal input part 24A, signals related to an intake flow rate measured by the airflow meter 31 and a boost pressure measured by the pressure sensor 33 are inputted. The turbo control part 24B includes an operation-point computing part 24B1 and a bypass-valve control part 24B2. The operation-point computing part 24B1 computes the operation point of the compressor 10 from the compressor map illustrated in FIG. 2, from the intake flow rate and the boost pressure inputted into the signal input part 24A. The bypass-valve control part 24B2 generates a bypass-valve opening degree command value such that increases the valve opening degree of the bypass valve 16, when the operation point computed by the operation-point computing part 24B1 is in the vicinity of the surge region. The signal related to the generated bypass-valve opening degree command value is outputted to the bypass valve 16 from the signal output part 24C, and thereby the valve opening degree of the bypass valve 16 is controlled.

In accordance with the improvement of the engines in recent years, the control logic and hardware configuration of the engine ECU 22 have become increasingly complicated. Thus, if the bypass-valve control part 24B2 for controlling the valve opening degree of the bypass valve 16 is mounted to the engine ECU 22, the control logic and hardware configuration of the engine ECU 22 would become even more complicated. Further, if a quickly-changing transitional phenomenon like surging is to be controlled by an engine ECU having a control logic and hardware configuration which are complicated, communication delay of the engine ECU may be a problem.

Thus, as in the present embodiment, it is possible to prevent the engine ECU 22 from becoming complicated by mounting the bypass-valve control part 24B2 to the turbo ECU 24 configured separately from the engine ECU 22. Further, since the turbo ECU 24 itself computes the operation point of the compressor 10 and controls the valve opening degree of the bypass valve 16 on the basis of the computed operation point, it is possible to control the bypass valve 16 quickly while avoiding an influence of communication delay as compared to a case where the engine ECU 22 controls the valve opening degree of the bypass valve 16.

The heating unit 18 is to heat the compressed intake air flowing through the bypass channel 14. As the heating unit 28, a heater may be provided, for instance, to be used as a heat source, or exhaust gas discharged from the engine body 2 may be used as a heat source as in the embodiments described below.

In the engine system 1 including the above intake bypass device 20, the intake bypass device 20 includes the heating unit 18 for heating the compressed intake air flowing through the bypass channel 14, and is configured so that the compressed intake air having been heated is guided to flow to the upstream side of the turbine 8. Thus, it is possible to prevent a decrease in the energy of the exhaust gas for driving the turbine 8 and to prevent insufficiency of the output of the turbine 8.

Second Embodiment

Figure 4:
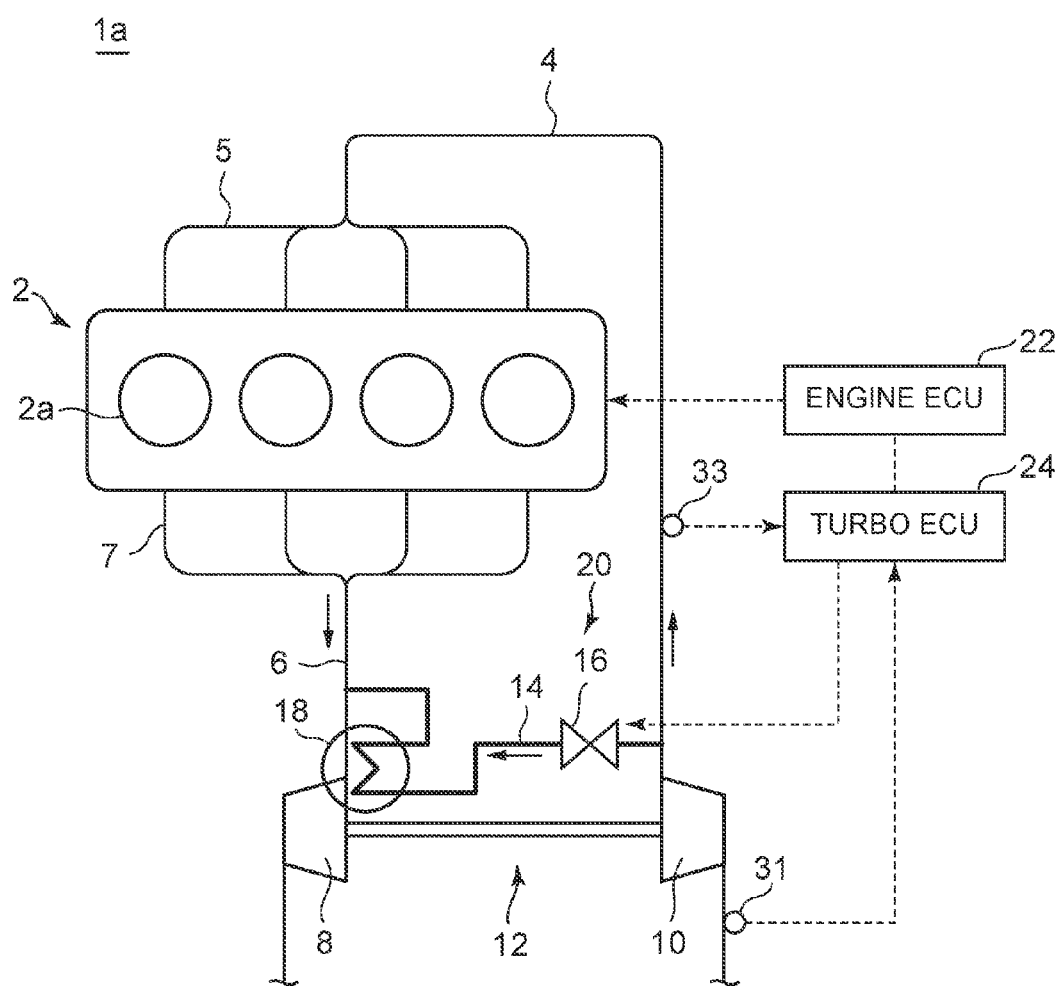
FIG. 4 is an overall configuration diagram of an engine system including an intake bypass device according to the second embodiment of the present invention.

FIG. 4 is an overall configuration diagram of an engine system including an intake bypass device according to the second embodiment of the present invention. The engine system 1a of the present embodiment basically has a similar configuration to that of the engine system 1 of the above described embodiment, except for the above described heating unit 18. Thus, the same components are associated with the same reference numerals and not described in detail.

Figure 5A:
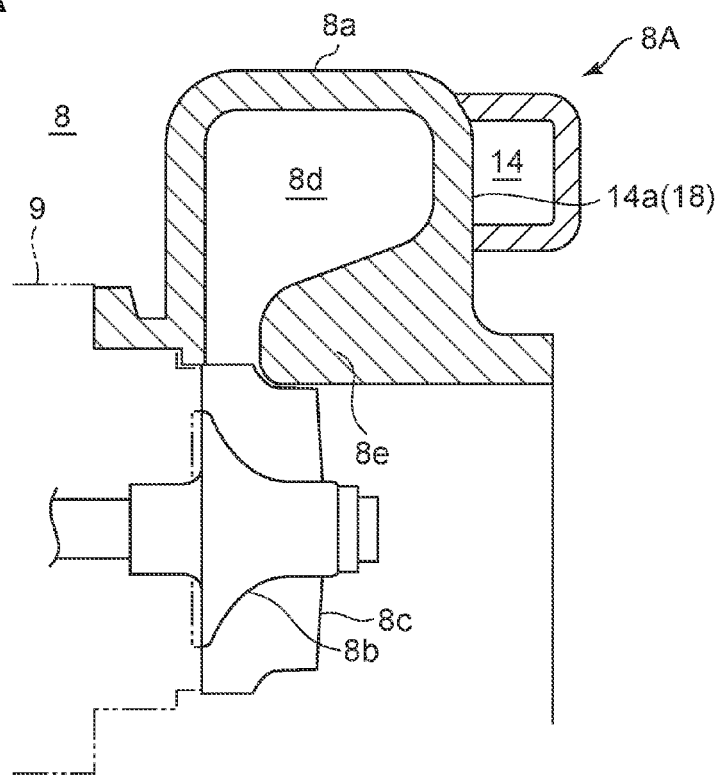
FIG. 5 is a schematic cross-sectional view illustrating an example of a heating unit of the second embodiment.
Figure 5B:
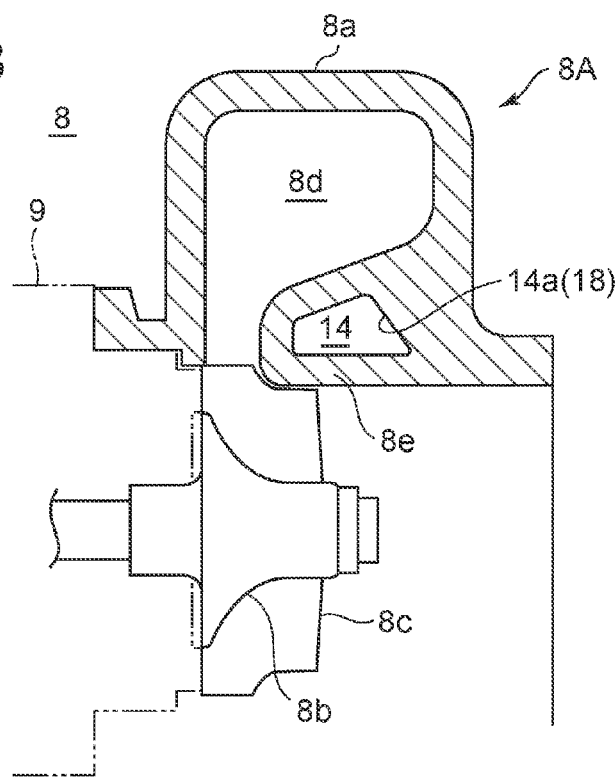

FIG. 5 is a schematic cross-sectional view illustrating an example of a heating unit of the second embodiment. The heating unit 18 of the embodiment illustrated in FIGS. 5A and 5B is constituted by a turbine housing 8A of the turbine 8 forming at least a part of an inner wall surface of the bypass channel 14, at least in a partial section of the bypass channel 14.

In the embodiment illustrated in FIG. 5A, in the turbine housing 8A, a part of an outer wall surface of a scroll portion 8a forming a scroll channel 8d forms a part of the inner wall surface of the bypass channel 14. The part of the outer wall surface of the scroll portion 8a indicated by the reference numeral 14a in the drawing corresponds to the heating unit 18 of the present embodiment. Further, in the embodiment illustrated in FIG. 5B, a through hole formed inside a shroud portion 8e of the turbine housing 8A constitutes the bypass channel 14, and an inner section of the shroud portion 8e of the turbine housing 8A forms the inner wall surface of the bypass channel 14. The entire inner wall surface indicated by the reference numeral 14a in the drawing corresponds to the heating unit 18 of the present embodiment. In the drawing, the reference numeral 8b indicates a hub, 8c indicates an impeller, and 9 indicates a bearing housing.

According to the above embodiment, it is possible to heat the compressed intake air flowing through the bypass channel 14 with the thermal energy of the exhaust gas flowing through the turbine housing 8A, which makes it possible to prevent a decrease in the energy of the exhaust gas for driving the turbine 8 and to prevent insufficiency of the output of the turbine 8. In addition, since it is possible to cool the turbine housing 8A with the compressed intake air flowing through the bypass channel 14, it is no longer necessary to use an expensive heat-resistant material for the turbine housing 8A, which makes it possible to reduce the cost.

Figure 6:
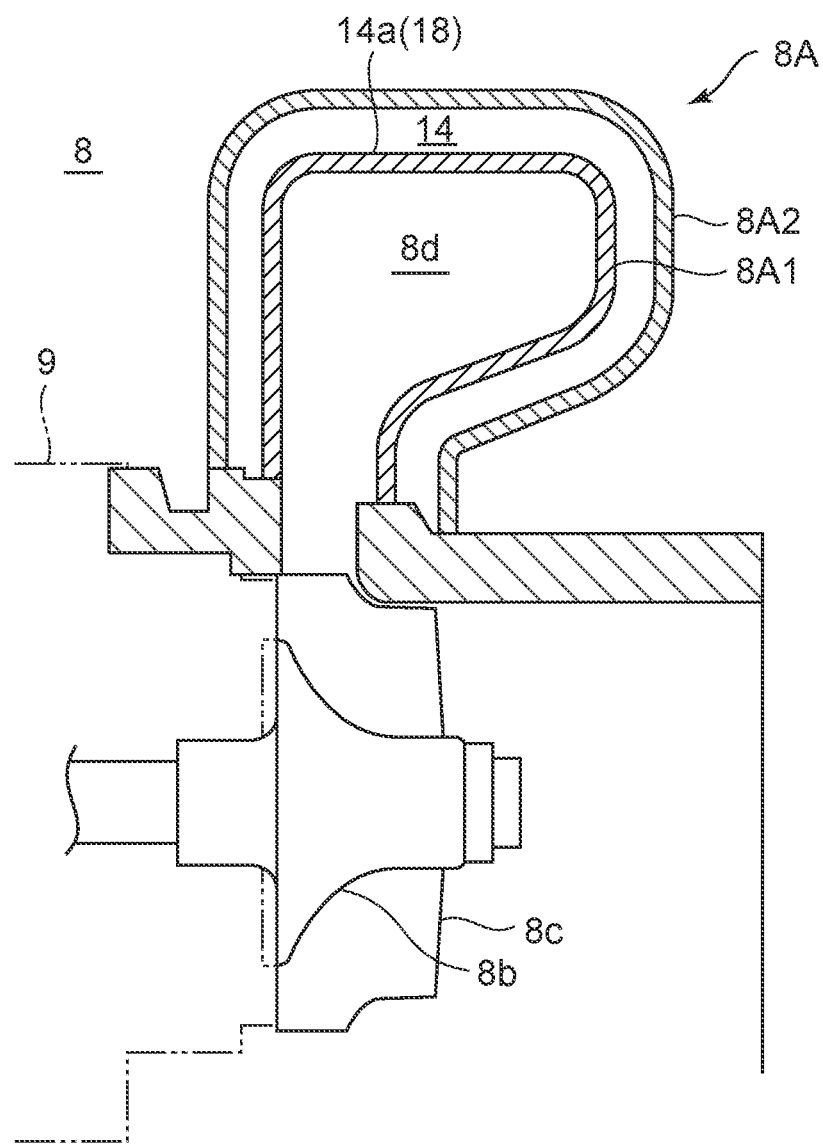
FIG. 6 is a schematic cross-sectional view illustrating another example of a heating unit of the second embodiment.

FIG. 6 is a schematic cross-sectional view illustrating another example of a heating unit of the second embodiment. In the embodiment illustrated in FIG. 6, a part of the turbine housing 8A has a dual structure including an inner housing 8A1 formed of sheet metal forming the scroll channel 8d and an outer housing 8A2 formed of sheet metal covering the inner housing 8A1. The space defined by the inner housing 8A1 and the outer housing 8A2 forms a partial section of the above described bypass channel 14. Specifically, an outer wall surface of the inner housing 8A1 forms a part of the inner wall surface of the bypass channel 14, and the outer wall surface (indicated by the reference numeral 14a in the drawing) of the inner housing 8A1 corresponds to the heating unit 18 of the present embodiment.

According to the above embodiment, the space defined by the inner housing 8A1 and the outer housing 8A2 constitutes a partial section of the above described bypass channel, and the compressed intake air flows through this space, which makes it possible to heat the compressed intake air and cool the turbine housing 8A efficiently.

Third Embodiment

Figure 7:
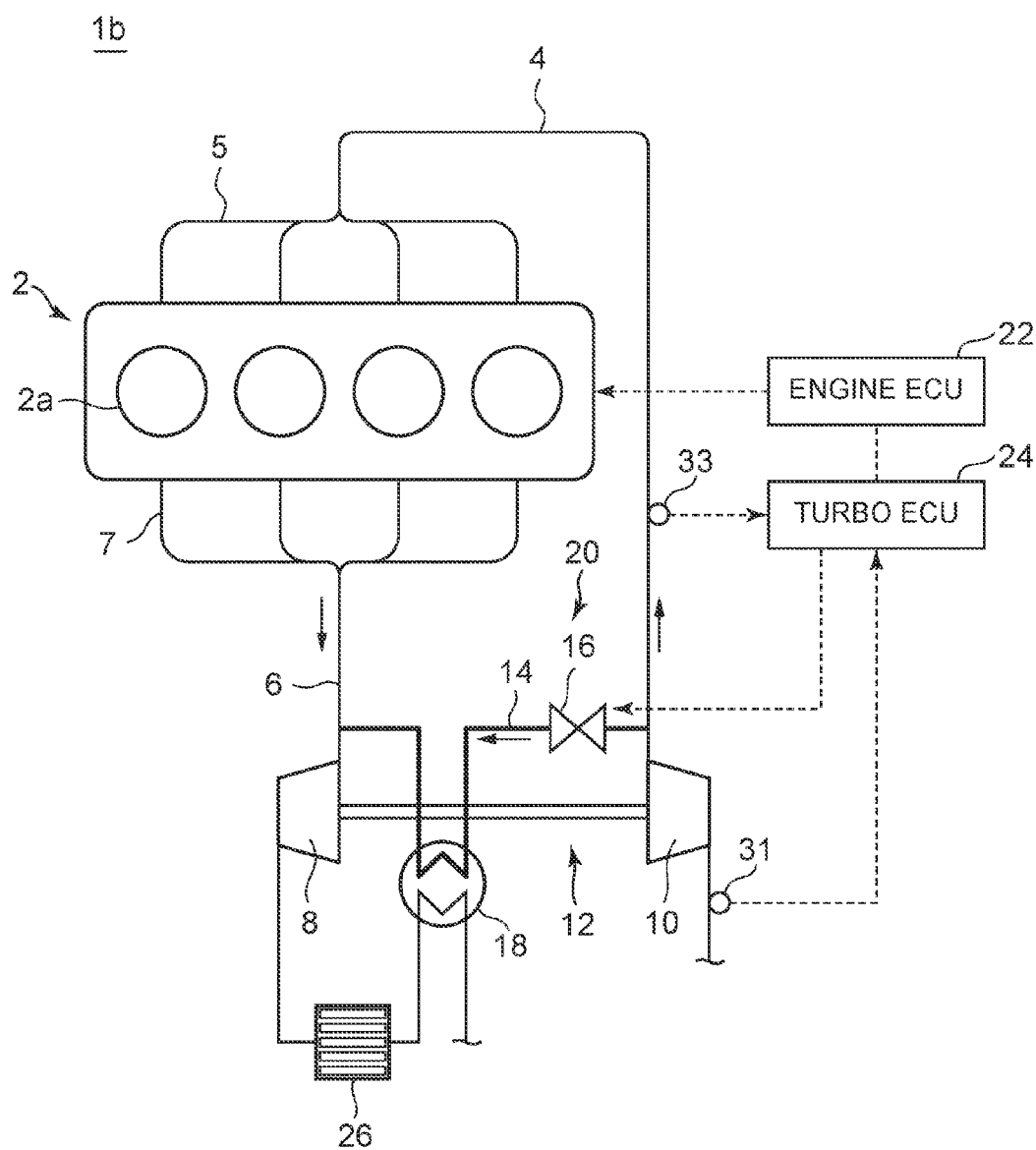
FIG. 7 is an overall configuration diagram of an engine system including an intake bypass device according to the third embodiment of the present invention.

FIG. 7 is an overall configuration diagram of an engine system including an intake bypass device according to the third embodiment of the present invention. The engine system 1b of the present embodiment further includes an exhaust-gas purification device 26 for purifying exhaust gas discharged from the engine body 2. The exhaust-gas purification device 26 is disposed on the downstream side of the turbine 8 in the exhaust channel 6. The above described heating unit 18 is disposed on the downstream side of the exhaust-gas purification device 26. For the rest, the engine system 1b of the present embodiment has a similar configuration to that of the above described embodiment, and thus the same components are associated with the same reference numerals and not described in detail.

Figure 8:
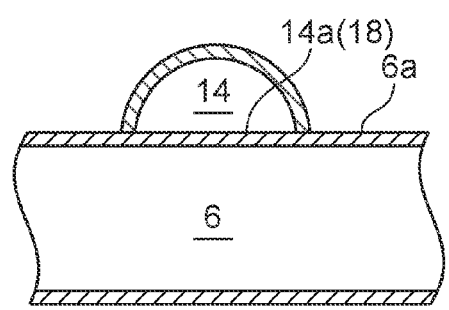
FIG. 8 is a schematic cross-sectional view illustrating an example of a heating unit of the third embodiment.

FIG. 8 is a schematic cross-sectional view illustrating an example of a heating unit of the third embodiment. The heating unit 18 of the embodiment illustrated in FIG. 8 is constituted by a part of an outer surface of an exhaust duct 6a of the exhaust channel 6 at the downstream side of the exhaust-gas purification device 26 forming at least a part of the inner wall surface of the bypass channel 14, in a partial section of the bypass channel 14. The part of the outer surface of the exhaust duct 6a indicated by the reference numeral 14a in the drawing corresponds to the heating unit 18 of the present embodiment.

According to the above embodiment, it is possible to heat the compressed intake air flowing through the bypass channel 14 with the thermal energy of the exhaust gas flowing through the exhaust channel 6, which makes is possible to prevent a decrease in the energy of the exhaust gas for driving the turbine 8 and to prevent shortage of the output of the turbine 8. In addition, since the remaining thermal energy of the exhaust gas after having driven the turbine 8 and passed through the exhaust-gas purification device 26 to heat a medium is recovered, it is possible to heat the compressed intake air without affecting the output of the turbine 8 or the purification performance of the exhaust-gas purification device 26.

Figure 9:
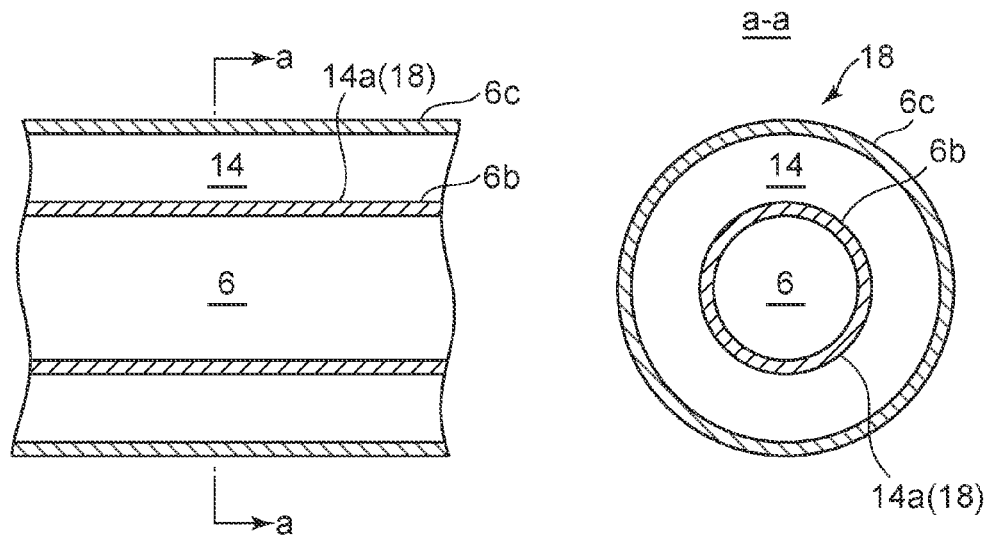
FIG. 9 is a schematic cross-sectional view illustrating another example of a heating unit of the third embodiment.

FIG. 9 is a schematic cross-sectional view illustrating another example of a heating unit of the third embodiment. In the embodiment illustrated in FIG. 9, at least a part of the exhaust channel 6 at the downstream side of the exhaust-gas purification device 26 has a dual structure including an inner exhaust duct 6b through which the exhaust gas flows and an outer exhaust duct 6c covering the inner exhaust duct. The space defined by the inner exhaust duct 6b and the outer exhaust duct 6c forms a partial section of the above described bypass channel 14. Specifically, an outer surface of the inner exhaust duct 6b forms a part of the inner wall surface of the bypass channel 14, and the outer surface (indicated by the reference numeral 14a in the drawing) of the inner exhaust duct 6b corresponds to the heating unit 18 of the present embodiment.

According to the above embodiment, the space defined by the inner exhaust duct 6b and the outer exhaust duct 6c constitutes a partial section of the above described bypass channel, and the compressed intake air flows through this space, which makes it possible to heat the compressed intake air efficiently.

Fourth Embodiment

Figure 10:
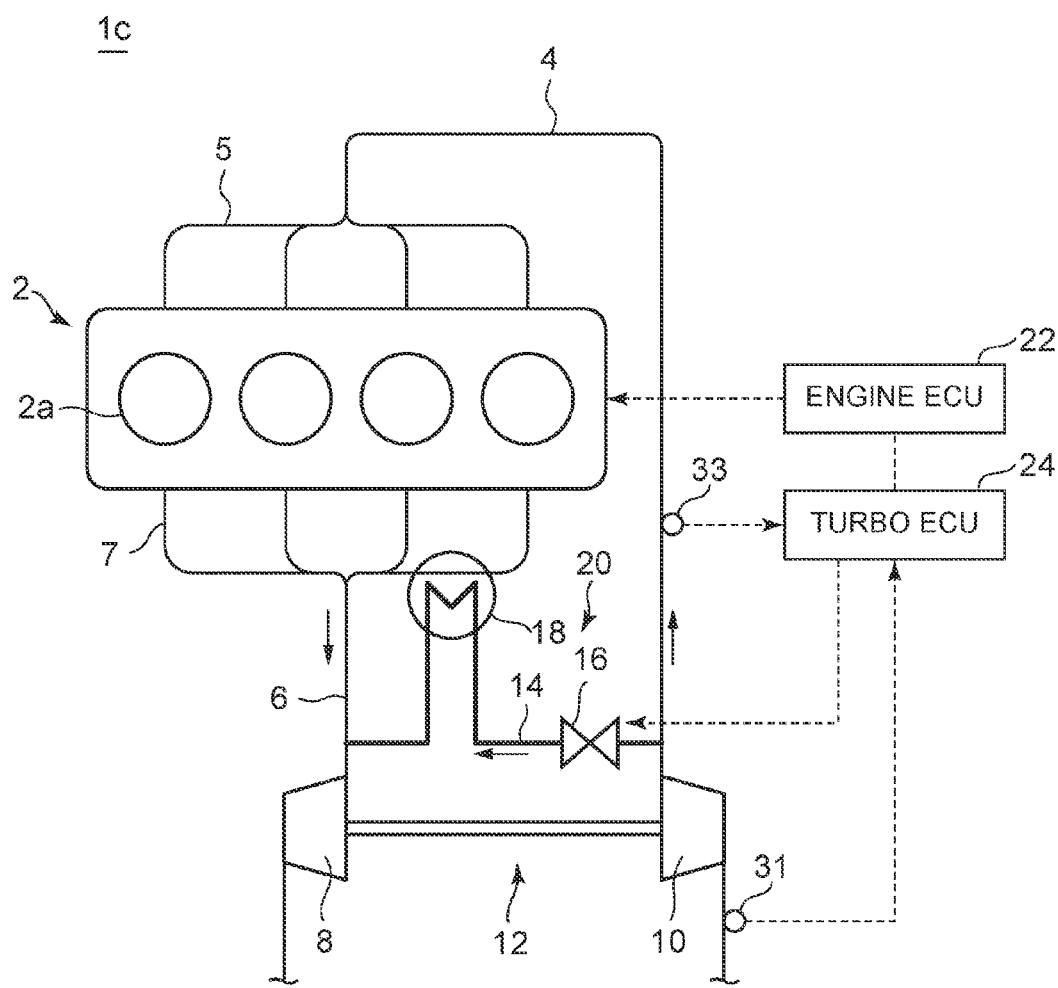
FIG. 10 is an overall configuration diagram of an engine system including an intake bypass device according to the fourth embodiment of the present invention.

FIG. 10 is an overall configuration diagram of an engine system including an intake bypass device according to the fourth embodiment of the present invention. The engine system 1c of the present embodiment basically has a similar configuration to that of the engine system 1 of the above described embodiment, except for the above described heating unit 18. Thus, the same components are associated with the same reference numerals and not described in detail.

Figure 11:
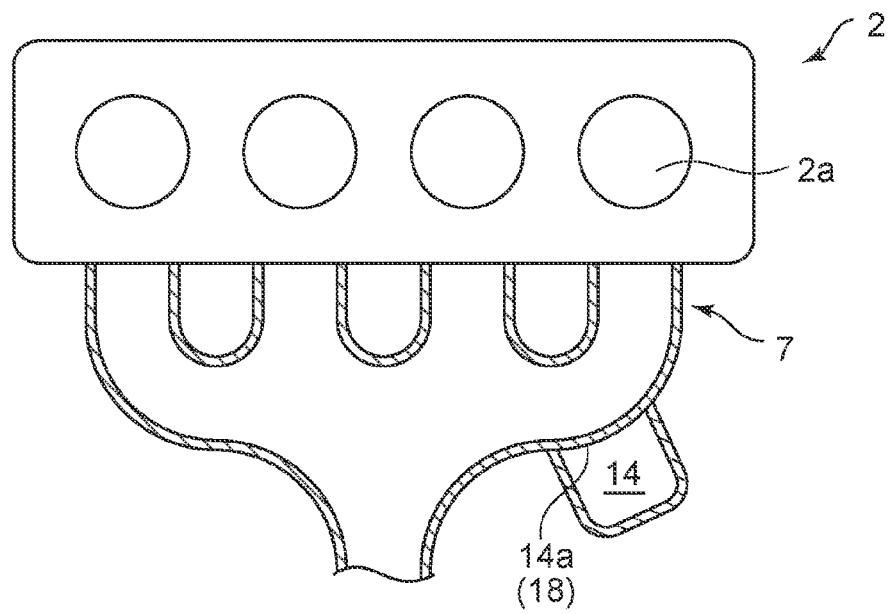
FIG. 11 is a schematic cross-sectional view illustrating an example of a heating unit of the fourth embodiment.

FIG. 11 is a schematic cross-sectional view illustrating an example of a heating unit of the fourth embodiment. The heating unit 18 of the embodiment illustrated in FIG. 11 is constituted by a part of an outer wall surface of an exhaust manifold 7 forming a part of the inner wall surface of the bypass channel 14, in a partial section of the bypass channel 14. The part of the outer surface of the exhaust manifold 7 indicated by the reference numeral 14a in the drawing corresponds to the heating unit 18 of the present embodiment.

According to the above embodiment, it is possible to heat the compressed intake air flowing through the bypass channel 14 with the thermal energy of the exhaust gas flowing through the exhaust manifold 7, which makes is possible to prevent a decrease in the energy of the exhaust gas for driving the turbine 8 and to prevent shortage of the output of the turbine 8. In addition, since the heat is exchanged with the high-temperature exhaust gas flowing through the exhaust manifold 7, it is no longer necessary to use an expensive thermal-resistant material for the exhaust manifold 7 and the exhaust channel 6 or the like disposed on the downstream side of the exhaust manifold 7, which makes it possible to reduce the cost.

Figure 12:
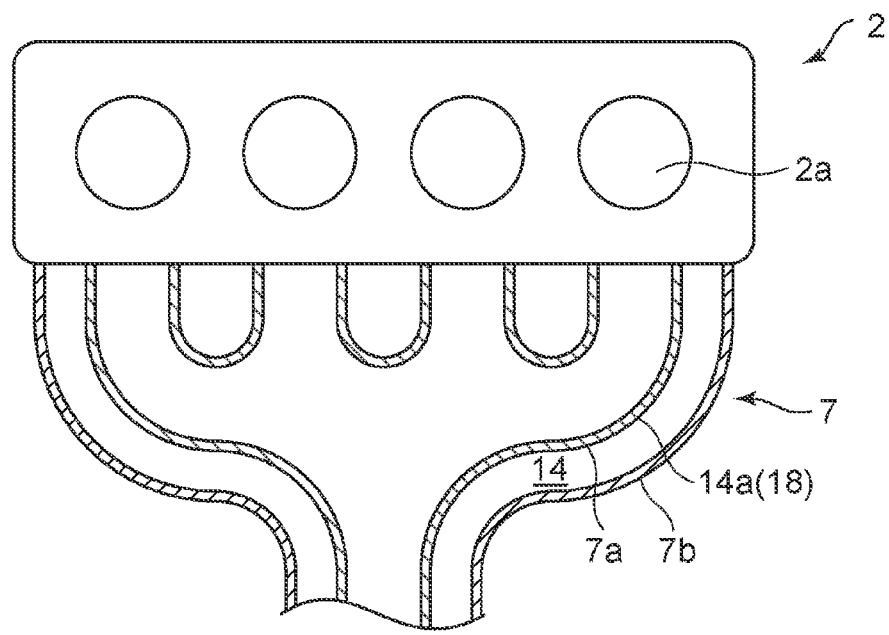
FIG. 12 is a schematic cross-sectional view illustrating another example of a heating unit of the fourth embodiment.

FIG. 12 is a schematic cross-sectional view illustrating another example of a heating unit of the fourth embodiment. In the embodiment illustrated in FIG. 12, at least a part of the exhaust manifold 7 has a dual structure including an inner exhaust manifold 7a through which the exhaust gas flows and an outer exhaust manifold 7b covering the inner exhaust manifold 7a. The space defined by the inner exhaust manifold 7a and the outer exhaust manifold 7b forms a partial section of the above described bypass channel 14. Specifically, an outer surface of the inner exhaust manifold 7a forms a part of the inner wall surface of the bypass channel 14, and the outer surface (indicated by the reference numeral 14a in the drawing) of the inner exhaust manifold 7a corresponds to the heating unit 18 of the present embodiment.

According to the above embodiment, the space defined by the inner exhaust manifold 7a and the outer exhaust manifold 7b constitutes a partial section of the above described bypass channel 14, and the compressed intake air flows through this space, which makes it possible to heat the compressed intake air and cool the exhaust manifold 7 efficiently.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably used in an engine including a turbocharger for not only automobiles but also for ships and other industrial usages.

DESCRIPTION OF REFERENCE NUMERALS 1, 1a to 1c Engine system
2 Engine body
2a Cylinder
4 Intake channel
5 Intake manifold
6 Exhaust channel
6a Exhaust duct
6b Inner exhaust duct
6c Outer exhaust duct
7 Exhaust manifold
7a Inner exhaust manifold
7b Outer exhaust manifold
8 Turbine
8A Turbine housing
8A1 Inner housing
8A2 Outer housing
8a Scroll portion
8b Hub
8c Impeller
8d Scroll channel 8e Shroud portion
10 Compressor
12 Turbocharger
14 Bypass channel
16 Bypass valve
18 Heating unit
20 Intake bypass device
22 Engine ECU
24 Turbo ECU
26 Exhaust-gas purification device
31 Airflow meter
33 Pressure sensor

The invention claimed is:

1. An engine system comprising:
an engine body;
an intake channel for supplying intake air to the engine body;
an exhaust channel through which exhaust gas discharged from the engine body flows;
a turbocharger including a turbine disposed in the exhaust channel and driven by energy of the exhaust gas discharged from the engine body, and a compressor disposed in the intake channel and driven coaxially with the turbine; and
an intake bypass device for guiding a part of compressed intake air compressed by the compressor to flow to an upstream side of the turbine bypassing the engine body; and
an exhaust-gas purification device for purifying the exhaust gas discharged from the engine body, the exhaust-gas purification device being disposed on a downstream side of the turbine in the exhaust channel,
wherein the intake bypass device includes
a bypass channel connecting a downstream side of the compressor in the intake channel and an upstream side of the turbine in the exhaust channel,
a bypass valve disposed in the bypass channel and configured to control a flow of the compressed intake air in the bypass channel, and
a heater that heats the compressed intake air flowing through the bypass channel, the heater being disposed on a downstream side of the bypass valve in the bypass channel, the heater including at least a part of an inner wall of the bypass channel,
wherein the heater is configured to utilize the exhaust gas discharged from the engine body as a heat source for heating the compressed intake air flowing through the bypass channel, and
wherein the heater comprises the exhaust channel on a downstream side of the exhaust-gas purification device, the exhaust channel on the downstream side of the exhaust-gas purification device forming at least a part of the inner wall surface of the bypass channel, in a partial section of the bypass channel.

2. The engine system according to claim 1,
wherein at least a part of the exhaust channel on the downstream side of the exhaust-gas purification device has a dual structure including an inner exhaust duct through which the exhaust gas flows and an outer exhaust duct covering the inner exhaust duct, and a space defined by the inner exhaust duct and the outer exhaust duct forms the partial section of the bypass channel.

3. The engine system according to claim 1, further comprising:
an engine controller configured to control an operation state of the engine body,
wherein the intake bypass device includes a turbo controller provided separate and independent from the engine controller, the turbo controller including,
an input that receives a sensor signal from a sensor, and
a processor and a memory that stores a program that causes the processor to control a valve opening degree of the bypass valve based on the received signal.

4. The engine system according to claim 3,
wherein the sensor signal is related to an operation state of the engine, and
the program causes the processor to
compute an operation point of the compressor on the basis of the sensor signal inputted into the input, and
to control the valve opening degree of the bypass valve to increase when the computed operation point is in a surge region.

5. The engine system according to claim 4,
wherein the sensor signal comprises a sensor signal related to a boost pressure of the compressed intake air compressed by the compressor and to an intake flow rate of the intake air flowing through the compressor.

* * * * *